United States Patent [19]
Becker et al.

[11] Patent Number: 5,575,603
[45] Date of Patent: Nov. 19, 1996

[54] BULK-SHIP UNLOADING SYSTEM

[75] Inventors: Hans J. Becker, Quierschied; Horst Steckel, St. Ingbert, both of Germany

[73] Assignee: PWH Anlagen + Systeme GmbH, St. Ingbert, Germany

[21] Appl. No.: 560,317

[22] Filed: Nov. 17, 1995

[30] Foreign Application Priority Data

Dec. 1, 1994 [DE] Germany .......................... 44 42 717.4

[51] Int. Cl.⁶ ..................................... B65G 67/60
[52] U.S. Cl. .................. 414/137.9; 198/519; 414/138.6; 414/140.7; 414/140.9
[58] Field of Search .................. 198/519; 414/140.7, 414/140.9, 141.1, 141.4

[56] References Cited

U.S. PATENT DOCUMENTS

| | | | |
|---|---|---|---|
| 3,349,892 | 10/1967 | Barre | 198/519 X |
| 3,392,818 | 7/1968 | Baschant | 414/141.4 X |
| 3,519,146 | 7/1970 | Moeller | 414/141.4 |
| 4,020,953 | 5/1977 | Eklöf et al. | 198/519 X |
| 4,732,523 | 3/1988 | Antikainen | 198/509 X |
| 4,927,311 | 5/1990 | Kada | 414/140.7 |
| 5,078,261 | 1/1992 | Miller et al. | 414/140.7 X |

FOREIGN PATENT DOCUMENTS

| | | |
|---|---|---|
| 0039487 | 11/1981 | European Pat. Off. . |
| 2217250 | 9/1974 | France . |
| 2421374 | 11/1975 | Germany ............ 414/141.1 |
| 2523948 | 12/1976 | Germany . |
| 3704392 | 10/1987 | Germany . |
| 3802420 | 8/1989 | Germany . |
| 3913359 | 6/1990 | Germany . |
| 4121996 | 1/1993 | Germany . |
| 4135467 | 4/1993 | Germany . |
| 1-8126 | 1/1989 | Japan ............ 414/140.7 |

*Primary Examiner*—Karen B. Merritt
*Assistant Examiner*—Janice L. Krizek
*Attorney, Agent, or Firm*—Herbert Dubno; Andrew Wilford

[57] ABSTRACT

An apparatus for unloading bulk material from a ship floating in a body of water has a carriage displaceable horizontally adjacent the ship, a turntable on the carriage, and a generally upright column having a lower end pivoted on the turntable and an upper end. A column-moving hydraulic cylinder has one end pivoted on the column and another arm pivoted on the turntable and an arm pivoted on the upper end of the column has an outer end above the ship and is provided with a conveyor. An arm-moving hydraulic cylinder has one end pivoted on the arm and another end pivoted on the turntable. An outer vertical conveyor pivoted on the outer arm end has a lower end engaged in the material in the ship for extracting the material from the ship and delivering it to the arm conveyor. A conveyor-moving hydraulic cylinder has one end pivoted on the vertical conveyor and an opposite end pivoted on the arm. A controller is connected to all of the cylinders for actuating same to sweep the lower end along the ship.

6 Claims, 3 Drawing Sheets

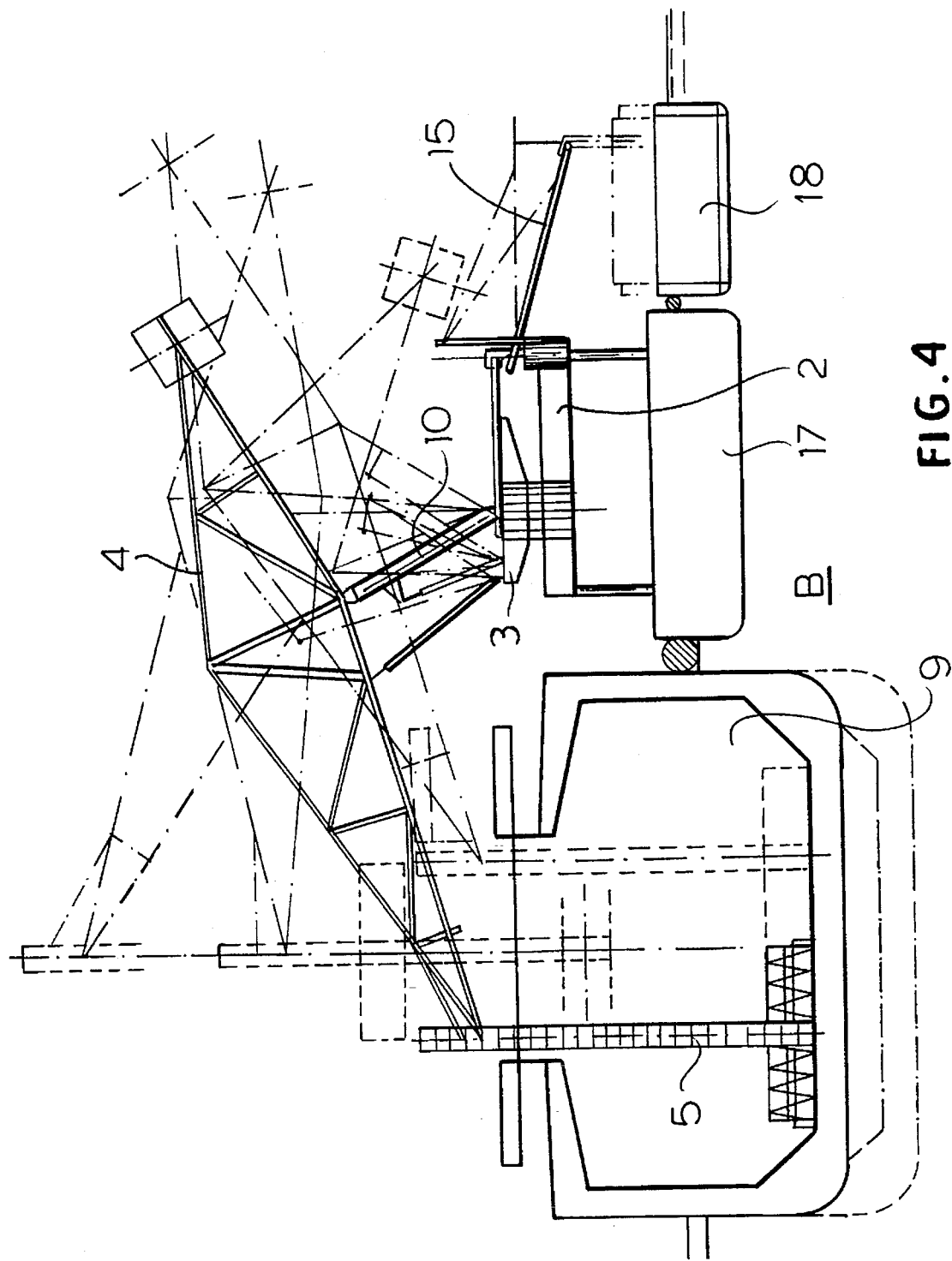

BULK-SHIP UNLOADING SYSTEM

FIELD OF THE INVENTION

The present invention relates to a ship unloading system. More particularly this invention concerns a system for unloading bulk material from a barge, lighter, or the like.

BACKGROUND OF THE INVENTION

In unloading bulk material—for instance ore, grain, or coal—from a bulk carrier such as a barge it is standard to pull the ship up adjacent a dock provided with a conveyor system having a vertically effective conveyor that is lowered by a crane arrangement right into the hold to scoop up and carry away the bulk material. French patent 2,217,250 of Riboulet, U.S. Pat. No. 4,732,523 of Antikainen, European application 0,039,487 of Straub, and German patents 2,523, 948, 3,704,392 of Fritsch, 3,802,420 of Grathoff, 3,913,359 of Grathoff, 4,121,996 of Grathoff, and 4,135,467 also of Grathoff all disclose systems where a dock-mounted support has an upper end on which is pivoted an elongated arm or boom whose outer end is provided with a vertically effective bucket or skip conveyor whose lower end is constituted as an intake. The arm is pivoted on the upper end of the support and the conveyor is in turn pivoted on the outer end of the arm so the conveyor can be moved up and down by pivoting of the arm. Frequently the support is constituted as a turntable and/or carriage so that the support and the arm can be moved to sweep the intake along the hold of the ship being emptied.

Such an arrangement cannot frequently reach all the corners of the hold, so that equipment must be employed to push the bulk material out to where the intake can get to it. Furthermore maneuvering the vertical conveyor so as to avoid various structures on the ship is also a problem with the known systems.

OBJECTS OF THE INVENTION

It is therefore an object of the present invention to provide an improved bulk-ship unloading system or apparatus.

Another object is the provision of such an improved bulk-ship unloading system or apparatus which overcomes the above-given disadvantages, that is which can be moved to reach virtually every corner of the hold of a ship pulled up alongside it.

SUMMARY OF THE INVENTION

An apparatus for unloading bulk material from a ship floating in a body of water has according to the invention a carriage displaceable horizontally adjacent the ship, a turntable on the carriage and a generally upright column having a lower end pivoted on the turntable and an upper end. A column-moving hydraulic cylinder has one end pivoted on the column and another arm pivoted on the turntable and an arm pivoted on the upper end of the column has an outer end above the ship and is provided with a conveyor. An arm-moving hydraulic cylinder has one end pivoted on the arm and another end pivoted on the turntable. An outer vertical conveyor pivoted on the outer arm end has a lower end engaged in the material in the ship for extracting the material from the ship and delivering it to the arm conveyor. A conveyor-moving hydraulic cylinder has one end pivoted on the vertical conveyor and an opposite end pivoted on the arm. A controller is connected to all of the cylinders for actuating same to sweep the lower end along the ship.

Thus with this system the location at which the arm is supported is movable, making it possible for the vertical conveyor at the lower end to be positioned very accurately virtually anywhere in the bulk carrier's hold. More particularly the arm-moving cylinder serves to maintain the intake end of the vertical conveyor at the same level so that no other means is needed to raise and lower it. The conveyor-moving cylinder serves to maintain the vertical conveyor perfectly vertical and thus avoid it swinging like a pendulum. Making the support column pivotal at its lower end on the turntable therefore makes it possible to move the vertical-conveyor intake in a direction perpendicular to the direction in which the carriage moves along the quay, something not possible with prior-art systems.

The system according to this invention can be made much lighter than the prior-art systems, in part by elimination of the normally massive support column for the arm. Since the vertical-conveyor intake can be moved perfectly perpendicular to the shore, the system can operate more quickly than hitherto possible where such positioning required movement in two directions of the various support elements. It is relatively simple to program the controller to automatically operate the cylinders to effectively sweep the entire floor of the ship, once its dimensions are known and a starting point is established.

According to the invention an inner vertical conveyor is provided in the column. In addition a horizontal conveyor has an outer end pivoted on the lower end of the column and an inner end and extending horizontally from the lower column end. A fourth hydraulic cylinder has one end pivoted on the turntable and an opposite end pivoted on the horizontal conveyor.

Furthermore in accordance with this invention a fifth hydraulic cylinder has one end pivoted on the turntable and an opposite end pivoted on the carriage. This fifth cylinder allows the arm to be positioned to hold the vertical conveyor over the dock as the carriage is moved from hold to hold to avoid striking the ship's superstructure with the vertical conveyor during such displacement.

BRIEF DESCRIPTION OF THE DRAWING

The above and other objects, features, and advantages will become more readily apparent from the following description, reference being made to the accompanying drawing in which:

FIG. 4 is a view like FIG. 1 showing an alternative arrangement according to the invention.

SPECIFIC DESCRIPTION

Figure 1:
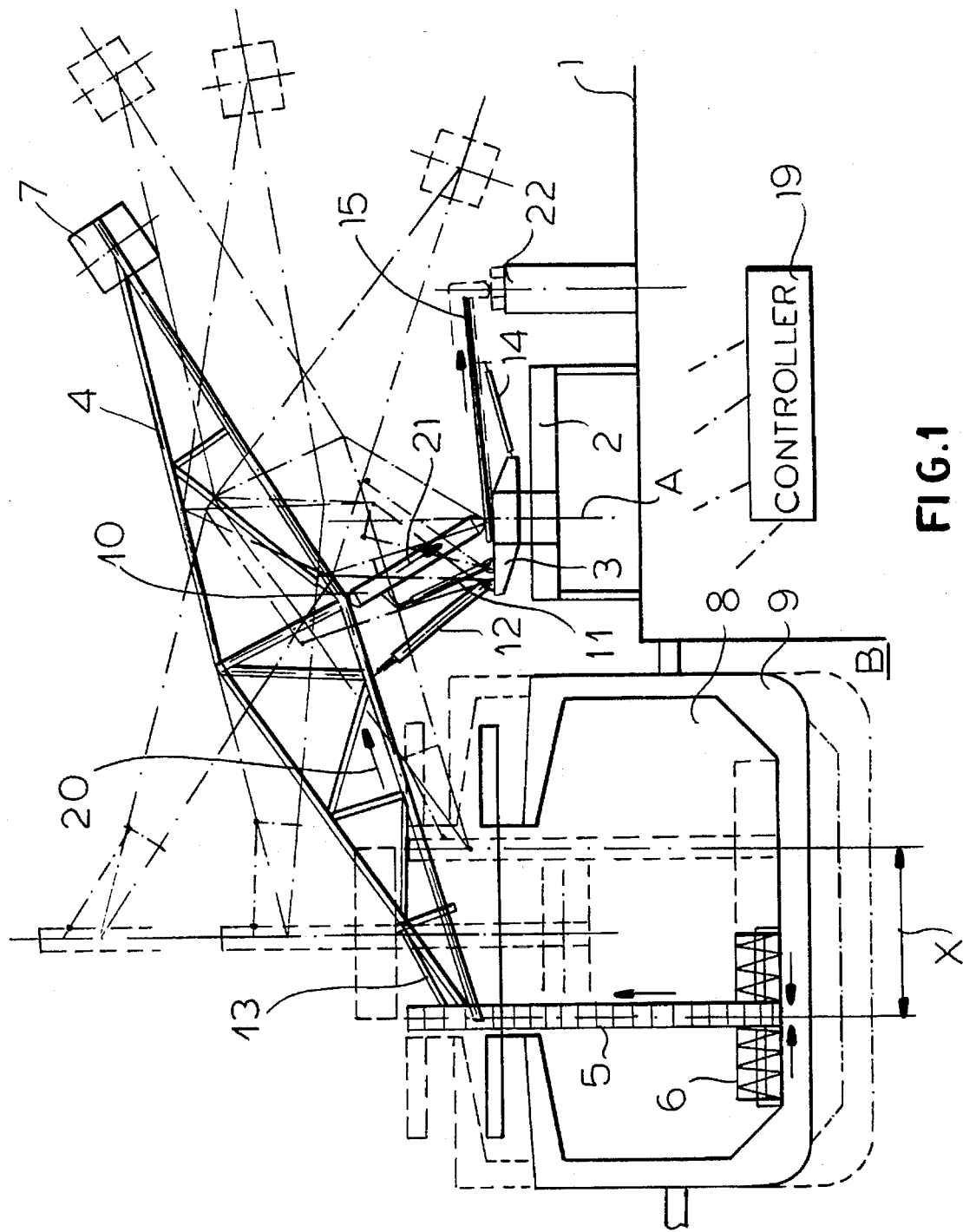
FIG. 1 is a partly schematic small-scale side view of the unloading apparatus according to the invention.
Figure 2:
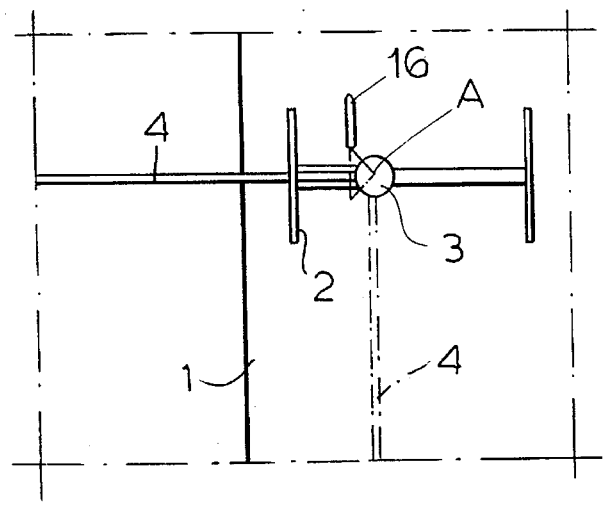
FIG. 2 is a mainly schematic top view of the inventive apparatus.
Figure 3:
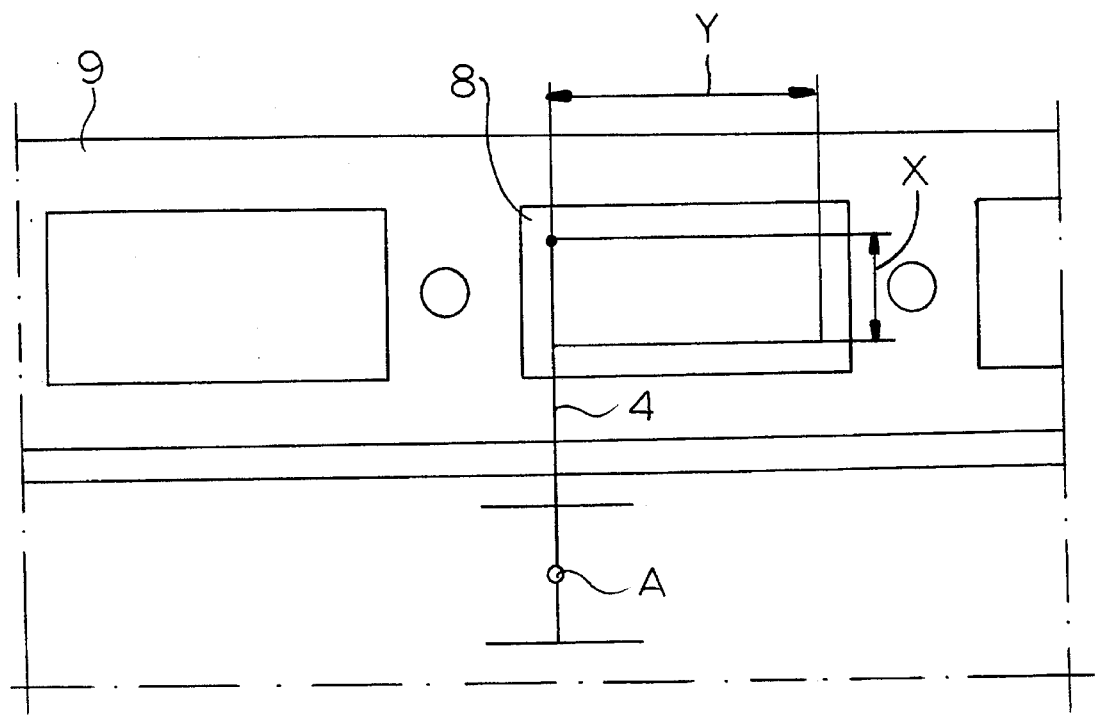
FIG. 3 is a schematic top view illustrating how the apparatus of this invention operates.

As seen in FIGS. 1–3 a dock or quay 1 supports a portal or carriage 2 movable in a longitudinal direction Y adjacent a body B of water in which floats a ship, here a barge 9, having a hold 8 filled with bulk material. The carriage 2 supports a turntable 3 rotatable about a vertical axis A. A hollow column 10 has one end pivoted on the turntable about a horizontal axis at the axis A and has an upper end on which is pivoted about another horizontal axis parallel to the axis at its lower end a long boom or arm 4 having an outer end above the ship 9 and an inner end provided with a counterweight 7. A vertical bucket or scraper conveyor 5 has an upper end pivoted on the outer end of the arm 4 about an axis parallel to the column axes and a lower end provided with an intake auger 6 that can be swept around the bottom of the hold 8 as described below. The arm 4 is provided internally with a horizontal conveyor indicated schematically by arrow 20 and the column 10 houses a vertical conveyor indicated schematically by the arrow 21. Another horizontal conveyor 15 has an inner end receiving material from the lower end of the conveyor 21 and an outer end that drops it onto a quay-side conveyor 22 extending in longitudinal direction Y.

According to the invention a first double-acting hydraulic cylinder 11 has a lower end pivoted on the turntable 3 and an upper end pivoted on the column 10 or on a short arm projecting perpendicularly therefrom. A second double-acting hydraulic cylinder 12 has its lower end also pivoted on the turntable 3 and an upper end pivoted on the arm 4 at a location somewhat offset from the upper end of the column 10. A third double-acting hydraulic cylinder 13 has an inner end pivoted on the arm 4 and an outer end pivoted on the vertical conveyor 5 at a location offset from where it is pivoted on the arm 4. A fourth cylinder 16 (FIG. 2) has one end pivoted on the carriage 2 and an opposite end pivoted on the turntable 3 offset from the axis A. A fifth double-acting hydraulic cylinder 14 has an outer end pivoted on the turntable 3 and an inner end on the inner horizontal conveyor 15. All these cylinders 11, 12, 13, 14, and 16 are operated by a controller 19 that pressurizes and depressurizes their front and back compartments as required to displace the intake 6.

FIG. 2 shows how the cylinder 16 can pivot the arm 4 into an out-of-service position shown in dot-dash lines in which it extends parallel to the dock 1. FIG. 3 shows how the intake 6 can be moved in the direction Y simply by travel of the portal or carriage 2 along the dock 1. For movement of it perpendicular thereto in direction x, the cylinders 11, 12, and 13 are appropriately actuated by the controller 19.

The arrangement of FIG. 4 has a float or pontoon 17 floating in the body of water adjacent the vessel 9 and supporting the portal 2. The conveyor 15 unloads into a smaller vessel 18 on the other side of the float 17.

We claim:

1. An apparatus for unloading bulk material from a ship floating in a body of water, the apparatus comprising:

a carriage displaceable horizontally adjacent the ship;

a turntable on the carriage;

a generally upright column having a lower end pivoted on the turntable and an upper end;

a column-moving hydraulic cylinder having one end pivoted on the column and another end pivoted on the turntable;

an arm pivoted on the upper end of the column and having an outer end above the ship and provided with a conveyor;

an arm-moving hydraulic cylinder having one end pivoted on the arm and another end pivoted on the turntable;

means including an outer vertical conveyor pivoted on the outer arm end and having a lower end engaged in the material in the ship for extracting the material from the ship and delivering it to the arm conveyor;

a conveyor-moving hydraulic cylinder having one end pivoted on the vertical conveyor and an opposite end pivoted on the arm; and control means connected to all of the cylinders for actuating same to sweep the lower end of the vertical conveyor along the ship.

2. The apparatus defined in claim 1, further comprising an inner vertical conveyor in the column.

3. The apparatus defined in claim 2, further comprising a horizontal conveyor having an inner end pivoted on the lower end of the column and an outer end and extending horizontally from the lower column end; and a fourth hydraulic cylinder having one end pivoted on the turntable and an opposite end pivoted on the horizontal conveyor.

4. The apparatus defined in claim 1, further comprising a fifth hydraulic cylinder having one end pivoted on the turntable and an opposite end pivoted on the carriage.

5. The apparatus defined in claim 1, further comprising a float supporting the carriage on the body of water.

6. The apparatus defined in claim 1 wherein the vertical conveyor is a scraper conveyor.

* * * * *